(12) United States Patent
Bartoszek et al.

(10) Patent No.: US 11,707,831 B2
(45) Date of Patent: Jul. 25, 2023

(54) POWER TOOL HOUSINGS

(71) Applicant: INGERSOLL-RAND INDUSTRIAL U.S., INC., Davidson, NC (US)

(72) Inventors: Jason Christopher Bartoszek, Bethlehem, PA (US); Joshua Odell Johnson, Allentown, PA (US); Sean C. Ely, Flemington, NJ (US); Douglas Fornell Leavitt, Bethlehem, PA (US); Dennis Naksen, Summit, NJ (US)

(73) Assignee: Ingersoll-Rand Industrial U.S., Inc., Davidson, NC (US)

( * ) Notice: Subject to any disclaimer, the term of this patent is extended or adjusted under 35 U.S.C. 154(b) by 0 days.

(21) Appl. No.: 17/682,538

(22) Filed: Feb. 28, 2022

(65) Prior Publication Data

US 2022/0314423 A1 Oct. 6, 2022

Related U.S. Application Data

(63) Continuation of application No. 15/172,214, filed on Jun. 3, 2016, now Pat. No. 11,260,517, and a
(Continued)

(51) Int. Cl.
*B25F 5/02* (2006.01)
*H02K 9/00* (2006.01)

(52) U.S. Cl.
CPC .......... *B25F 5/02* (2013.01); *H02K 9/00* (2013.01)

(58) Field of Classification Search
CPC .. B25B 21/00; B25F 5/02; H02K 5/04; H02K 9/00
See application file for complete search history.

(56) References Cited

U.S. PATENT DOCUMENTS 288,701 A 11/1883 Fell
1,495,153 A 5/1924 Benjamin
(Continued)

FOREIGN PATENT DOCUMENTS

CN 2650085 Y 10/2004
CN 1575218 A 2/2005
(Continued)

OTHER PUBLICATIONS

2145QiMax 3/4" Air Impacted "Maximum Impact"; Ingersoll-Rand, Aug. 26, 2014.
(Continued)

*Primary Examiner* — Thomas M Wittenschlaeger
*Assistant Examiner* — David G Shutty
(74) *Attorney, Agent, or Firm* — Kevin E. West; Advent, LLP

(57) ABSTRACT

A power tool is provided that, in one version, includes a front housing that supports an output drive, and a back cap located opposite the front housing. The back cap receives at least one fastener of the plurality of fasteners. A motor housing supports a motor and is located between the front housing and the back cap. The motor includes a rotor that is configured to rotate about a motor axis to drive rotation of the output drive. The fastener is disposed through the back cap, and secures to the front housing coupling the front housing, the motor housing, and the back cap together.

18 Claims, 5 Drawing Sheets

Related U.S. Application Data continuation of application No. PCT/US2016/035674, filed on Jun. 3, 2016.

(60) Provisional application No. 62/171,768, filed on Jun. 5, 2015, provisional application No. 62/171,768, filed on Jun. 5, 2015.

(56) References Cited

U.S. PATENT DOCUMENTS

| | | | |
|---|---|---|---|
| 1,892,997 A | 1/1933 | Alfred et al. | |
| 2,531,800 A | 11/1950 | Anderson | |
| 2,543,979 A | 3/1951 | Maurer | |
| 2,637,825 A | 5/1953 | Moore | |
| 2,855,679 A | 10/1958 | Gibble | |
| 2,858,701 A | 11/1958 | Willcox | |
| 2,984,210 A | 5/1961 | Fuehrer | |
| 3,221,192 A | 11/1965 | Franklin | |
| 3,225,232 A | 12/1965 | Turley et al. | |
| 3,336,490 A | 8/1967 | Yelpo et al. | |
| 3,353,078 A | 11/1967 | Maynard | |
| 3,440,465 A | 4/1969 | Pratt et al. | |
| 3,451,492 A | 6/1969 | Ekstrom et al. | |
| 3,462,623 A | 8/1969 | Batson et al. | |
| 3,476,960 A * | 11/1969 | Rees | B25F 5/02 |
| | | | 310/216.118 |
| 3,572,447 A | 3/1971 | Pauley et al. | |
| 3,578,091 A | 5/1971 | States | |
| 3,592,087 A | 7/1971 | Pauley | |
| 3,611,095 A | 10/1971 | Schnizler | |
| 3,643,749 A | 2/1972 | Pauley | |
| 3,703,933 A | 11/1972 | Schoeps | |
| 3,710,873 A | 1/1973 | Allen | |
| 3,741,313 A | 6/1973 | States | |
| 3,760,209 A * | 9/1973 | Hult | H02K 5/04 |
| | | | 310/90 |
| 3,835,934 A | 9/1974 | Schoeps et al. | |
| 3,894,254 A | 7/1975 | Holther, Jr. | |
| 3,908,766 A | 9/1975 | Hess | |
| 3,920,082 A | 11/1975 | Dudek | |
| 4,032,806 A | 6/1977 | Seely | |
| 4,156,821 A | 5/1979 | Kurome et al. | |
| 4,284,109 A | 8/1981 | Kilmer et al. | |
| 4,292,571 A | 9/1981 | Cuneo | |
| 4,307,325 A | 12/1981 | Saar | |
| 4,412,158 A | 10/1983 | Jefferson et al. | |
| 4,454,459 A | 6/1984 | Huber | |
| 4,506,743 A | 3/1985 | Grossmann | |
| 4,510,404 A | 4/1985 | Barrett et al. | |
| 4,513,381 A | 4/1985 | Houser, Jr. et al. | |
| 4,514,172 A | 4/1985 | Behringer | |
| 4,597,419 A | 7/1986 | Galloup et al. | |
| 4,661,756 A | 4/1987 | Murphy et al. | |
| 4,791,833 A | 12/1988 | Sakai et al. | |
| 4,795,932 A * | 1/1989 | Long | H02K 1/17 |
| | | | 310/43 |
| 4,838,361 A | 6/1989 | O'Toole | |
| 4,893,942 A | 1/1990 | Stottmann | |
| 4,978,877 A | 12/1990 | Quirijnen | |
| 4,991,472 A | 2/1991 | Hollingsworth | |
| 5,014,793 A | 5/1991 | Germanton et al. | |
| 5,105,130 A | 4/1992 | Barker et al. | |
| 5,138,243 A | 8/1992 | Kress et al. | |
| 5,200,658 A * | 4/1993 | Kohno | H02K 1/17 |
| | | | 310/91 |
| 5,203,242 A | 4/1993 | Hansson | |
| 5,360,072 A | 11/1994 | Lange | |
| 5,365,155 A | 11/1994 | Zimmermann | |
| 5,473,519 A | 12/1995 | McCallops et al. | |
| 5,525,842 A | 6/1996 | Leininger | |
| 5,526,460 A | 6/1996 | DeFrancesco et al. | |
| 5,531,278 A | 7/1996 | Lin | |
| 5,553,675 A | 9/1996 | Pitzen et al. | |
| 5,561,734 A | 10/1996 | Simonsen et al. | |
| 5,563,482 A | 10/1996 | Shaw et al. | |
| 5,567,999 A | 10/1996 | Baronosky et al. | |
| 5,712,543 A | 1/1998 | Sjostrom | |
| 5,714,815 A | 2/1998 | Fritzinger et al. | |
| 5,714,861 A | 2/1998 | Hansen et al. | |
| 5,738,177 A * | 4/1998 | Schell | B25B 23/14 |
| | | | 173/181 |
| 5,804,936 A | 9/1998 | Brodsky et al. | |
| 5,818,142 A | 10/1998 | Edleblute et al. | |
| 5,897,454 A | 4/1999 | Cannaliato | |
| 5,992,257 A | 11/1999 | Nemetz et al. | |
| 5,998,897 A | 12/1999 | Bosten et al. | |
| 6,037,724 A | 3/2000 | Buss et al. | |
| 6,043,575 A * | 3/2000 | Ghode | H02K 7/145 |
| | | | 310/91 |
| 6,239,521 B1 | 5/2001 | Lee | |
| 6,250,399 B1 | 6/2001 | Giardino | |
| 6,318,189 B1 | 11/2001 | Donaldson | |
| 6,353,705 B1 | 3/2002 | Capps et al. | |
| 6,359,355 B1 * | 3/2002 | Hartsfield | H02K 1/185 |
| | | | 310/254.1 |
| 6,424,799 B1 | 7/2002 | Gilmore | |
| 6,508,313 B1 | 1/2003 | Carney et al. | |
| 6,511,200 B2 | 1/2003 | Matsunaga | |
| 6,536,536 B1 | 3/2003 | Gass et al. | |
| 6,598,684 B2 | 7/2003 | Watanabe | |
| 6,607,041 B2 | 8/2003 | Suzuki et al. | |
| 6,687,567 B2 | 2/2004 | Watanabe | |
| 6,691,796 B1 | 2/2004 | Wu | |
| 6,713,905 B2 | 3/2004 | Hirschburger et al. | |
| 6,725,945 B2 | 4/2004 | Sugimoto et al. | |
| 6,814,461 B2 | 11/2004 | Minalga | |
| 6,933,632 B2 | 8/2005 | Braml et al. | |
| 6,945,337 B2 | 9/2005 | Kawai et al. | |
| 6,948,647 B1 | 9/2005 | Niblett et al. | |
| 6,968,908 B2 | 11/2005 | Tokunaga et al. | |
| 6,988,897 B2 | 1/2006 | Belongia et al. | |
| 7,033,137 B2 | 4/2006 | Shufeldt | |
| 7,058,291 B2 | 6/2006 | Weaver et al. | |
| 7,090,032 B2 | 8/2006 | Wada et al. | |
| 7,109,675 B2 | 9/2006 | Matsunaga et al. | |
| 7,112,934 B2 | 9/2006 | Gilmore | |
| 7,152,329 B2 | 12/2006 | Kondo et al. | |
| 7,155,986 B2 | 1/2007 | Kawai et al. | |
| 7,201,235 B2 | 4/2007 | Umemura et al. | |
| 7,213,500 B2 | 5/2007 | Chang | |
| 7,235,940 B2 | 6/2007 | Bosch et al. | |
| 7,236,243 B2 | 6/2007 | Beecroft et al. | |
| 7,237,622 B2 | 7/2007 | Liao | |
| 7,311,027 B1 | 12/2007 | Tatsuno | |
| 7,322,427 B2 | 1/2008 | Shimma et al. | |
| 7,331,406 B2 | 2/2008 | Wottreng, Jr. et al. | |
| 7,334,648 B2 | 2/2008 | Arimura | |
| 7,372,228 B2 | 5/2008 | Hahn et al. | |
| 7,397,153 B2 | 7/2008 | Buck et al. | |
| 7,398,834 B2 | 7/2008 | Jung et al. | |
| 7,404,450 B2 | 7/2008 | Izumisawa et al. | |
| 7,419,013 B2 | 9/2008 | Sainomoto et al. | |
| 7,494,437 B2 | 2/2009 | Chen | |
| 7,578,357 B2 | 8/2009 | Schell | |
| 7,588,094 B2 | 9/2009 | Lin | |
| 7,600,577 B2 | 10/2009 | Simm et al. | |
| 7,607,493 B2 | 10/2009 | Erhardt | |
| 7,665,392 B2 | 2/2010 | Tokunaga et al. | |
| 7,677,752 B2 | 3/2010 | Tadokoro et al. | |
| 7,705,482 B2 | 4/2010 | Leininger | |
| 7,712,546 B2 | 5/2010 | Tokunaga | |
| 7,717,192 B2 | 5/2010 | Schroeder et al. | |
| 7,718,109 B2 | 5/2010 | Robb et al. | |
| 7,817,384 B2 | 10/2010 | Woods et al. | |
| 7,821,217 B2 | 10/2010 | Abolhassani et al. | |
| 7,839,112 B2 | 11/2010 | Wei | |
| 7,882,899 B2 | 2/2011 | Borinato et al. | |
| 7,928,615 B2 * | 4/2011 | Miyashita | H02K 5/08 |
| | | | 310/43 |
| 7,942,211 B2 | 5/2011 | Scrimshaw et al. | |
| 7,980,320 B2 | 7/2011 | Inagaki et al. | |
| 8,016,048 B2 | 9/2011 | Ueda et al. | |
| 8,091,650 B2 | 1/2012 | Van Der Linde et al. | |
| 8,122,971 B2 | 2/2012 | Whitmire et al. | |

(56) References Cited

U.S. PATENT DOCUMENTS

| | | |
|---|---|---|
| 8,197,379 B1 | 6/2012 | Yin |
| 8,210,275 B2 | 7/2012 | Suzuki et al. |
| 8,267,924 B2 | 9/2012 | Zemlok et al. |
| 8,294,399 B2 | 10/2012 | Suzuki et al. |
| 8,303,449 B2 | 11/2012 | Ho et al. |
| 8,316,958 B2 | 11/2012 | Schell et al. |
| 8,317,350 B2 | 11/2012 | Friedman et al. |
| 8,371,708 B2 | 2/2013 | Nagasaka et al. |
| 8,381,830 B2 | 2/2013 | Puzio et al. |
| 8,415,911 B2 | 4/2013 | Lau et al. |
| 8,430,180 B2 | 4/2013 | Gumpert et al. |
| 8,430,182 B2 | 4/2013 | Soika et al. |
| 8,496,366 B2 | 7/2013 | Leong |
| 8,511,399 B2 | 8/2013 | Kunz |
| 8,528,658 B2 | 9/2013 | Roehm et al. |
| 8,541,914 B2 | 9/2013 | Knight et al. |
| 8,584,770 B2 | 11/2013 | Zhang et al. |
| 8,593,020 B2 | 11/2013 | Chun et al. |
| 8,607,893 B2 | 12/2013 | Kumagai et al. |
| 8,636,081 B2 | 1/2014 | Ludy et al. |
| 8,674,640 B2 | 3/2014 | Suda et al. |
| 8,708,861 B2 | 4/2014 | Inagaki et al. |
| 8,714,888 B2 | 5/2014 | Bean et al. |
| 8,727,034 B2 | 5/2014 | Leong et al. |
| 8,746,364 B2 | 6/2014 | Atsumi et al. |
| 8,757,286 B2 | 6/2014 | Nagasaka et al. |
| 8,800,679 B2 | 8/2014 | Eshleman et al. |
| 8,807,414 B2 | 8/2014 | Ross et al. |
| 8,820,430 B2 | 9/2014 | Walker et al. |
| 8,919,456 B2 | 12/2014 | Ng et al. |
| 8,939,228 B2 | 1/2015 | Kondo |
| 9,089,954 B2 | 7/2015 | Roehm |
| 9,193,055 B2 | 11/2015 | Lim et al. |
| 9,217,492 B2 | 12/2015 | Kierspe et al. |
| 9,220,201 B2 | 12/2015 | Kratzig et al. |
| 9,271,620 B2 | 3/2016 | Meredith et al. |
| 9,314,855 B2 | 4/2016 | Ookubo et al. |
| 9,321,156 B2 | 4/2016 | Eshleman et al. |
| 9,385,352 B2 | 7/2016 | Nguyen et al. |
| 9,415,448 B2 | 8/2016 | Schenk et al. |
| 9,463,563 B2 | 10/2016 | Takeuchi et al. |
| 9,566,692 B2 | 2/2017 | Seith et al. |
| 9,579,785 B2 | 2/2017 | Bixler et al. |
| 9,739,366 B2 | 8/2017 | Duerr |
| 9,827,660 B2 | 11/2017 | Blum et al. |
| 9,950,417 B2 | 4/2018 | Ito et al. |
| 10,046,450 B2 | 8/2018 | Bernhart et al. |
| 10,052,733 B2 | 8/2018 | Ely et al. |
| 10,064,639 B2 | 9/2018 | Ishida et al. |
| 10,418,879 B2 | 9/2019 | Bartoszek et al. |
| 10,513,025 B2 | 12/2019 | Patel et al. |
| 10,518,879 B1 | 12/2019 | Zhang et al. |
| 10,528,073 B2 | 1/2020 | Williams et al. |
| 10,615,670 B2 | 4/2020 | Madineni et al. |
| 2002/0001434 A1 | 1/2002 | Kikinis |
| 2002/0018474 A1 | 2/2002 | Assa et al. |
| 2002/0020538 A1 | 2/2002 | Giardino |
| 2002/0050364 A1 | 5/2002 | Suzuki et al. |
| 2002/0096342 A1 | 7/2002 | Milbourne |
| 2002/0108474 A1 | 8/2002 | Adams |
| 2002/0131267 A1 | 9/2002 | Van Osenbruggen |
| 2002/0153856 A1 | 10/2002 | Gilmore |
| 2002/0172035 A1 | 11/2002 | Hara et al. |
| 2002/0185514 A1 | 12/2002 | Adams et al. |
| 2003/0002934 A1 | 1/2003 | Hsu |
| 2003/0121679 A1* | 7/2003 | Taga .................. B25B 21/02 173/93.5 |
| 2003/0136570 A1 | 7/2003 | Izumisawa et al. |
| 2003/0149508 A1 | 8/2003 | Watanabe |
| 2004/0035495 A1 | 2/2004 | Hessenberger et al. |
| 2004/0211573 A1 | 10/2004 | Carrier et al. |
| 2005/0040206 A1 | 2/2005 | Adams et al. |
| 2005/0135084 A1 | 6/2005 | Chen et al. |
| 2005/0183870 A1 | 8/2005 | Wada et al. |
| 2005/0224242 A1 | 10/2005 | Britz et al. |
| 2005/0257945 A1 | 11/2005 | Justis et al. |
| 2005/0263304 A1 | 12/2005 | Sainomoto et al. |
| 2005/0279197 A1 | 12/2005 | Wottreng, Jr. et al. |
| 2006/0012584 A1 | 1/2006 | Vassallo et al. |
| 2006/0071433 A1 | 4/2006 | Miller |
| 2006/0109246 A1 | 5/2006 | Lee et al. |
| 2006/0118314 A1 | 6/2006 | Aeberhard et al. |
| 2006/0125333 A1 | 6/2006 | Wehner et al. |
| 2006/0185869 A1 | 8/2006 | Arimura |
| 2006/0201612 A1 | 9/2006 | Lin |
| 2006/0226718 A1 | 10/2006 | Yang |
| 2006/0237205 A1 | 10/2006 | Sia et al. |
| 2006/0243469 A1 | 11/2006 | Webster |
| 2007/0000676 A1 | 1/2007 | Arimura |
| 2007/0180959 A1 | 8/2007 | Tokunaga et al. |
| 2007/0193762 A1 | 8/2007 | Arimura et al. |
| 2007/0222310 A1 | 9/2007 | Drexlmaier |
| 2007/0256847 A1 | 11/2007 | Wan et al. |
| 2008/0000665 A1 | 1/2008 | Kokinelis et al. |
| 2008/0025017 A1 | 1/2008 | Tadokoro et al. |
| 2008/0032848 A1 | 2/2008 | Ho |
| 2008/0048650 A1 | 2/2008 | Islam et al. |
| 2008/0066941 A1 | 3/2008 | Kobayashi |
| 2008/0122302 A1 | 5/2008 | Leininger |
| 2009/0090763 A1 | 4/2009 | Zemlok et al. |
| 2009/0098971 A1 | 4/2009 | Ho et al. |
| 2009/0188688 A1 | 7/2009 | Gumpert et al. |
| 2009/0200053 A1 | 8/2009 | Scrimshaw et al. |
| 2009/0221222 A1 | 9/2009 | Lo et al. |
| 2009/0308624 A1 | 12/2009 | Shibata et al. |
| 2010/0000846 A1 | 1/2010 | Nemetz |
| 2010/0163261 A1 | 7/2010 | Tomayko et al. |
| 2010/0175902 A1 | 7/2010 | Rejman et al. |
| 2010/0200380 A1 | 8/2010 | Staas et al. |
| 2010/0252287 A1 | 10/2010 | Morimura et al. |
| 2010/0263890 A1 | 10/2010 | Profunser et al. |
| 2010/0282482 A1 | 11/2010 | Austin et al. |
| 2010/0307782 A1 | 12/2010 | Iwata et al. |
| 2010/0326686 A1 | 12/2010 | Leong et al. |
| 2011/0000688 A1 | 1/2011 | Iwata |
| 2011/0024144 A1 | 2/2011 | Usselman et al. |
| 2011/0036605 A1 | 2/2011 | Leong et al. |
| 2011/0048750 A1 | 3/2011 | Leong et al. |
| 2011/0056715 A1 | 3/2011 | Vanko et al. |
| 2011/0073343 A1 | 3/2011 | Sawano et al. |
| 2011/0079407 A1 | 4/2011 | Iimura et al. |
| 2011/0109093 A1 | 5/2011 | Leininger |
| 2011/0127059 A1 | 6/2011 | Limberg et al. |
| 2011/0132630 A1 | 6/2011 | Kawamura et al. |
| 2011/0147028 A1 | 6/2011 | Iwashita et al. |
| 2011/0147029 A1 | 6/2011 | Roehm et al. |
| 2011/0180290 A1 | 7/2011 | Kondo |
| 2011/0188232 A1 | 8/2011 | Friedman et al. |
| 2011/0203819 A1 | 8/2011 | Tsai et al. |
| 2011/0248650 A1 | 10/2011 | Sterling et al. |
| 2011/0284256 A1 | 11/2011 | Iwata |
| 2011/0308827 A1 | 12/2011 | Kaufmann |
| 2011/0315417 A1 | 12/2011 | Matsunaga et al. |
| 2012/0013829 A1 | 1/2012 | Song et al. |
| 2012/0019080 A1 | 1/2012 | Kottmyer et al. |
| 2012/0055690 A1 | 3/2012 | Uemura |
| 2012/0089131 A1 | 4/2012 | Zemlok et al. |
| 2012/0090863 A1 | 4/2012 | Puzio et al. |
| 2012/0132449 A1 | 5/2012 | Hecht et al. |
| 2012/0138329 A1* | 6/2012 | Sun .................. B25F 5/02 173/221 |
| 2012/0175142 A1 | 7/2012 | Van Der Linde et al. |
| 2012/0205131 A1 | 8/2012 | Furusawa et al. |
| 2012/0234568 A1 | 9/2012 | Schnell et al. |
| 2012/0273242 A1 | 11/2012 | Eshleman et al. |
| 2012/0279736 A1 | 11/2012 | Tanimoto et al. |
| 2012/0292071 A1* | 11/2012 | Su .................. B25B 21/00 173/218 |
| 2012/0292472 A1 | 11/2012 | Segura et al. |
| 2012/0318544 A1* | 12/2012 | Sun .................. B25F 5/00 173/221 |
| 2012/0318549 A1 | 12/2012 | Nagasaka et al. |
| 2013/0014967 A1 | 1/2013 | Ito et al. |
| 2013/0033217 A1 | 2/2013 | Hirabayashi |

(56) References Cited

U.S. PATENT DOCUMENTS

| | | |
|---|---|---|
| 2013/0056235 A1 | 3/2013 | Pozgay et al. |
| 2013/0056236 A1 | 3/2013 | Morinishi et al. |
| 2013/0062086 A1 | 3/2013 | Ito et al. |
| 2013/0062088 A1 | 3/2013 | Mashiko et al. |
| 2013/0062498 A1 | 3/2013 | Ito et al. |
| 2013/0068491 A1 | 3/2013 | Kusakawa et al. |
| 2013/0075121 A1 | 3/2013 | Nakamura et al. |
| 2013/0087355 A1 | 4/2013 | Oomori et al. |
| 2013/0105189 A1 | 5/2013 | Murthy et al. |
| 2013/0108385 A1 | 5/2013 | Woelders |
| 2013/0126202 A1 | 5/2013 | Oomori et al. |
| 2013/0133912 A1 | 5/2013 | Mizuno et al. |
| 2013/0153252 A1 | 6/2013 | Sakakibara |
| 2013/0153253 A1 | 6/2013 | Ludy et al. |
| 2013/0161040 A1 | 6/2013 | Tomayko et al. |
| 2013/0175066 A1 | 7/2013 | Zhang et al. |
| 2013/0186661 A1 | 7/2013 | Okubo et al. |
| 2013/0186666 A1 | 7/2013 | Yoshino et al. |
| 2013/0193891 A1 | 8/2013 | Wood et al. |
| 2013/0206434 A1 | 8/2013 | Braun |
| 2013/0206435 A1 | 8/2013 | Papp |
| 2013/0213680 A1 | 8/2013 | Chen |
| 2013/0220655 A1 | 8/2013 | Tomayko |
| 2013/0228353 A1 | 9/2013 | Chen et al. |
| 2013/0228356 A1 | 9/2013 | Hayes et al. |
| 2013/0240230 A1 | 9/2013 | Saur |
| 2013/0247706 A1 | 9/2013 | Duerr |
| 2013/0267374 A1 | 10/2013 | Blum et al. |
| 2013/0269961 A1 | 10/2013 | Lim et al. |
| 2013/0270932 A1 | 10/2013 | Hatfield et al. |
| 2013/0270934 A1 | 10/2013 | Smith et al. |
| 2013/0274797 A1 | 10/2013 | Nicholas et al. |
| 2013/0284480 A1 | 10/2013 | Horie et al. |
| 2013/0292147 A1 | 11/2013 | Mergener et al. |
| 2013/0313925 A1 | 11/2013 | Mergener et al. |
| 2013/0327552 A1 | 12/2013 | Lovelass et al. |
| 2013/0331994 A1 | 12/2013 | Ng et al. |
| 2013/0333904 A1 | 12/2013 | Raggl et al. |
| 2013/0333910 A1 | 12/2013 | Tanimoto et al. |
| 2013/0342084 A1 | 12/2013 | Su |
| 2014/0015383 A1* | 1/2014 | Kokinelis ............... B25F 5/02 310/68 A |
| 2014/0026723 A1 | 1/2014 | Persson et al. |
| 2014/0036482 A1 | 2/2014 | Vanko et al. |
| 2014/0058390 A1 | 2/2014 | Taylor et al. |
| 2014/0069676 A1 | 3/2014 | Abante et al. |
| 2014/0096985 A1 | 4/2014 | Chu et al. |
| 2014/0100687 A1 | 4/2014 | Ekstrom et al. |
| 2014/0102741 A1 | 4/2014 | Sekino et al. |
| 2014/0138111 A1 | 5/2014 | Takeuchi et al. |
| 2014/0158390 A1 | 6/2014 | Mashiko et al. |
| 2014/0166326 A1 | 6/2014 | Le Du et al. |
| 2014/0182869 A1 | 7/2014 | Kumagai et al. |
| 2014/0182870 A1 | 7/2014 | Herr |
| 2014/0209342 A1* | 7/2014 | Chen ............... B25F 5/02 173/218 |
| 2014/0290973 A1* | 10/2014 | Lin ............... B25F 5/02 173/104 |
| 2014/0338503 A1 | 11/2014 | Beer et al. |
| 2014/0365012 A1 | 12/2014 | Chen et al. |
| 2014/0367134 A1 | 12/2014 | Phillips et al. |
| 2015/0014010 A1 | 1/2015 | Chang |
| 2015/0041163 A1 | 2/2015 | McClung |
| 2015/0047866 A1 | 2/2015 | Sakai et al. |
| 2015/0047943 A1 | 2/2015 | Park |
| 2015/0122521 A1 | 5/2015 | Chen et al. |
| 2015/0122523 A1 | 5/2015 | Yamamoto et al. |
| 2015/0122524 A1 | 5/2015 | Papp |
| 2015/0129248 A1 | 5/2015 | Nitsche et al. |
| 2015/0136433 A1 | 5/2015 | Nitsche et al. |
| 2015/0144365 A1 | 5/2015 | Hirabayashi et al. |
| 2015/0151424 A1 | 6/2015 | Elder et al. |
| 2015/0171654 A1 | 6/2015 | Horie et al. |
| 2015/0197003 A1* | 7/2015 | Lin ............... B23Q 5/06 173/218 |
| 2015/0202759 A1 | 7/2015 | Wang |
| 2015/0209948 A1 | 7/2015 | Hecht et al. |
| 2015/0222162 A1 | 8/2015 | Pinkley et al. |
| 2015/0328760 A1 | 11/2015 | Ikuta et al. |
| 2015/0336249 A1 | 11/2015 | Iwata et al. |
| 2016/0102762 A1 | 4/2016 | Brennenstuhl et al. |
| 2016/0118201 A1 | 4/2016 | Nicholas et al. |
| 2016/0131353 A1 | 5/2016 | Bartoszek |
| 2016/0176027 A1 | 6/2016 | Aoyagi |
| 2016/0250738 A1 | 9/2016 | Leh et al. |
| 2016/0311094 A1 | 10/2016 | Mergener et al. |
| 2016/0354889 A1 | 12/2016 | Ely et al. |
| 2016/0354905 A1 | 12/2016 | Ely et al. |
| 2016/0354915 A1 | 12/2016 | Bartoszek et al. |
| 2017/0222382 A1 | 8/2017 | Peloquin et al. |
| 2017/0225309 A1 | 8/2017 | Meyer |
| 2018/0161951 A1 | 6/2018 | Billings et al. |

FOREIGN PATENT DOCUMENTS

| | | |
|---|---|---|
| CN | 1583370 A | 2/2005 |
| CN | 101253015 A | 8/2008 |
| CN | 103481251 A | 1/2014 |
| CN | 103989497 A | 8/2014 |
| CN | 104162880 A | 11/2014 |
| CN | 104676315 A | 6/2015 |
| DE | 19518591 A1 | 12/1996 |
| DE | 102004051913 A1 | 2/2006 |
| DE | 102005015900 A1 | 2/2006 |
| DE | 202006018761 U1 | 2/2007 |
| DE | 102006000543 A1 | 6/2008 |
| DE | 102008020173 A1 | 10/2009 |
| DE | 102012211914 A1 | 10/2013 |
| DE | 202016104126 U1 | 8/2016 |
| EP | 0271903 A2 | 6/1988 |
| EP | 0585541 A2 | 3/1994 |
| EP | 0585541 A3 | 11/1994 |
| EP | 0585541 B1 | 9/1997 |
| EP | 0808018 A1 | 11/1997 |
| EP | 0911119 A2 | 4/1999 |
| EP | 1426989 A1 | 6/2004 |
| EP | 1524085 A2 | 4/2005 |
| EP | 1595649 A2 | 11/2005 |
| EP | 1595650 A2 | 11/2005 |
| EP | 1867438 A2 | 12/2007 |
| EP | 1943061 A2 | 7/2008 |
| EP | 1982798 A2 | 10/2008 |
| EP | 1207016 B1 | 1/2009 |
| EP | 2042271 A2 | 4/2009 |
| EP | 2062670 A2 | 5/2009 |
| EP | 2062700 A2 | 5/2009 |
| EP | 1524084 B1 | 8/2009 |
| EP | 2075094 B1 | 2/2011 |
| EP | 1447177 B1 | 4/2011 |
| EP | 2256899 B1 | 8/2011 |
| EP | 2184138 A3 | 12/2011 |
| EP | 2524775 A2 | 11/2012 |
| EP | 2535150 A2 | 12/2012 |
| EP | 2687338 A1 | 1/2014 |
| GB | 752251 A | 7/1956 |
| GB | 1068990 A | 5/1967 |
| GB | 1413293 A | 11/1975 |
| GB | 2396390 A | 6/2004 |
| GB | 2514261 A | 11/2014 |
| JP | H08193896 A | 7/1996 |
| JP | H08294878 A | 11/1996 |
| JP | 2000218561 A | 8/2000 |
| JP | 2002331427 A | 11/2002 |
| JP | 2004202600 A | 7/2004 |
| JP | 2004239681 A | 8/2004 |
| JP | 2005254400 A | 9/2005 |
| JP | 2006272488 A | 10/2006 |
| JP | 2006312210 A | 11/2006 |
| JP | 2009269137 A | 11/2009 |
| JP | 2010012585 A | 1/2010 |
| JP | 2011031369 A | 2/2011 |
| JP | 2011067910 A | 4/2011 |
| JP | 2011230272 A | 11/2011 |
| JP | 2012035358 A | 2/2012 |

(56) References Cited

FOREIGN PATENT DOCUMENTS

| | | |
|---|---|---|
| JP | 2012149669 A | 8/2012 |
| RU | 2360786 C2 | 7/2009 |
| TW | 201231843 A | 8/2012 |
| WO | 9853959 A1 | 12/1998 |
| WO | 0064639 A1 | 11/2000 |
| WO | 0144776 A1 | 6/2001 |
| WO | 0154865 A2 | 8/2001 |
| WO | 0230624 A2 | 4/2002 |
| WO | 02058891 A1 | 8/2002 |
| WO | 2004029569 A1 | 4/2004 |
| WO | 2006111173 A1 | 10/2006 |
| WO | 2009011633 A1 | 1/2009 |
| WO | 2010110716 A1 | 9/2010 |
| WO | 2011013852 A1 | 2/2011 |
| WO | 2011099487 A1 | 8/2011 |
| WO | 2011102559 A1 | 8/2011 |
| WO | 2012002578 A1 | 1/2012 |
| WO | 2012023452 A1 | 2/2012 |
| WO | 2013037325 A1 | 3/2013 |
| WO | 2013164905 A1 | 11/2013 |
| WO | 2013183535 A1 | 12/2013 |
| WO | 2014098256 A1 | 6/2014 |
| WO | 2014108110 A1 | 7/2014 |
| WO | 2014124859 A1 | 8/2014 |
| WO | 2016196899 A1 | 12/2016 |

OTHER PUBLICATIONS

3W Portable Rechargeable LED Work Light with Magnetic Base Power Car Charger, from: http://www.ebay.com/itm/like/141277021128?1pid=82; dated Sep. 10, 2014.
Ac85-265v or Dc12v/24v Epistar Cob Led Chip Led Work Flashlight, from: http://www.alibaba.com/product-detail!AC85-265v-or-dc 12v-24v-epistar _ 1450867344.html; dated Sep. 10, 2014.
Ace LED Work Light with Stand; Retrieved on Sep. 2, 2014 from: http://www.acehardware.com/product/index.jsp?productId=19607576; dated Sep. 2, 2014.
"Air Impact Wrench 588A1 Maintenance Information"; Ingersoll-Rand, Nov. 1, 2007.
ATD 80304 Saber 3Watt Cob LED Strip Light Plus 2.4watt Top Light, from: https://www.google.com/shopping/product/3819105557822370488?q=COB+LED+flashlight&espv=2&biw=1680&bih=949&bav=on.2; dated Sep. 10, 2014.
ATD Tools 80335 35W Cob LED Worklight w/Stand, from: https://www.google.com/shopping/product/16993246027546592360?q=COB+LED+flashlight&espv=2&biw=1680&bih=949&bav=on.2; dated Sep. 10, 2014.
CLIPSTRIP™ AQUA—Waterproof & Rechargeable LED Strip Light, from: http://www.cliplight.com/automotive/lighting/compact-series/clipstrip-aqu a/; Dated Sep. 10, 2014.
CN I 04676315 Dated Jun. 3, 2015, Chou; English Translation.
Dial a Speed; Taken from the Internet on Aug. 29, 2014 from http://makezine.com/projects/the-dial-a-speed/.
Examination Report for European Application No. 16804498.8, dated May 29, 2019.
Examination Report for European Application No. 16804555.7, dated Feb. 1, 2022.
Examination Report for European Application No. 16804555.7, dated Feb. 2, 2021.
Examination Report for European Application No. 16804555.7, dated May 13, 2022.
Examination Report for European Application No. 16804555.7, dated Sep. 7, 2021.
Extended European Search Report for European Application 16804509.4, dated Feb. 20, 2019.
Extended European Search Report for European Application No. 16804498.0, dated Sep. 25, 2018.
Extended European Search Report for European Application No. 16804555.7, dated May 13, 2019 (Date completed May 2, 2019).
Extended European Search Report for European Application No. EP 16804517.7, dated Dec. 4, 2018.
Festool RO 90 DX; Taken from the Internet on Aug. 29, 2014 from http://www.thewoodnerd.com/reviews/festoolR090DX.html.
Hot Sell High Brightness Cob Flashlight, from http://www.alibaba.com/product-detail!Hot-sell-high-brightn ess-COB-Flashlight_l850789033.html; dated Sep. 10, 2014.
International Search Report and Written Opinion for PCT/US2016/035665, dated Aug. 26, 2016.
International Search Report and Written Opinion for PCT/US2016/035681, dated Sep. 6, 2016.
International Search Report and Written Opinion for PCT/US2016/035698, dated Aug. 31, 2016.
International Search Report and Written Opinion for PCT/US2016/035797, dated Sep. 2, 2016.
International Search Report and Written Opinion for PCT/US2016/035807, dated Oct. 7, 2016.
International Search Report for European Application No. 16804505.2, dated Feb. 4, 2019.
International Search Report for PCT/US2016/035674, dated Sep. 14, 2016.
Jimmy Houston Folding Flip Light; Retrieved on Sep. 2, 2014 from: http://www.walmart.com/ip/20512279?wmlspartner=wlpa&adid=22222222227014895251&wlO=&wll=g&wl2=c&wl3=40969534952&wl4=&wl5=pla&wl6=78912422192&veh=sem#ProductDetail; dated Sep. 2, 2014.
Laser-Flex 2D by Penn Tool Co.; Retrieved on Sep. 2, 2014 from: http://www.penntoolco.com/catalog/products/products.cfm?categoryiD=1351; dated Sep. 2, 2014.
"Life Box Series by Streamlight"; Retrieved on Sep. 2, 2014 from: http://www.streamlight.com/en-ca/product/class.html?cid=6; dated Sep. 2, 2014.
Makita Flashlight, ML140, 14.4V, from http://www.globalindustrial.com/p/tools/portable-worklights/Flashlights-Handheld/flashlight-ml140-144 v; dated Sep. 10, 2014.
Office Action dated Oct. 16, 2017; U.S. Appl. No. 15/172,247.
Office Action for Chinese Application No. 201680031397.8, dated Dec. 5, 2018.
Office Action for Chinese Application No. 201680031488.1, dated Dec. 11, 2018.
Office Action for Chinese Application No. 201680031710.8, dated Dec. 18, 2018.
Office Action for Chinese Application No. 201680031738.1, dated Dec. 18, 2018.
Office Action for Chinese Patent Application No. 201680031739.6, dated Nov. 20, 2020.
Office Action for Chinese Patent Application No. 201680031740.9, dated Nov. 23, 2020.
Partial Supplementary European Search Report for European Application No. 16804555.7, dated Jan. 18, 2019 (Search completed Jan. 9, 2019).
PELICAN Remote Area Lighting; Retrieved on Sep. 2, 2014 from: http://www.grainger.com/product/PELICAN-Remote-Area-Lighting-System-5RZY8?s_pp=false&picUrl=//static.grainger.com/rp/s/is/image/Grainger/5RZY8ASO1?$smthumb$; dated Sep. 2, 2014.
Supplemental European Search Report for European Application 16804550.8, dated Dec. 19, 2018.
Supplementary European Search Report for European Application No. 16804505, dated Jan. 28, 2018.
SYCLONE by Streamlight; Retrieved on Sep. 2, 2014 from http://www.smokesign.com/syrefl.html; dated Sep. 2, 2014.
Zoro LED Worklight by Cooper; Retrieved on Sep. 2, 2014 from: http://www.zoro.com/i/G4585287/?utm_source=google_shopping&utm_medium=cpc&utm_campaign=Google_Shopping_Feed&gclid=CPm46JHwwsACFRMLMgod_H8AyA; dated Sep. 2, 2014.

* cited by examiner

POWER TOOL HOUSINGS

RELATED APPLICATION

The present application is a continuation under 35 U.S.C. § 120 of U.S. patent application Ser. No. 15/172,214, filed Jun. 3, 2016, entitled "Power Tool Housings," which claims priority to U.S. Provisional Patent Application, Ser. No. 62/171,768, filed on Jun. 5, 2015, entitled "Power Tool Housings." The present application is also a continuation of International Application No. PCT/US16/35674, filed on Jun. 3, 2016, entitled "Power Tool Housings." The subject matter disclosed in U.S. patent application Ser. No. 15/172, 214, U.S. Provisional Patent Application Ser. No. 62/171, 768, and International Application No. PCT/US16/35674 is hereby expressly incorporated into the present application.

TECHNICAL FIELD AND SUMMARY

The present disclosure relates, generally, to housings for power tools and, more particularly, to housings for cordless power tools, such as cordless impact tools.

Existing housings for power tools are typically sized to accommodate motor housings of motors included in the power tools. For example, some power tool housings may include two halves, sometimes referred to as "clam shells," which are secured together to hold the motor housing of the motor within the halves of the power tool housings. In such arrangements, the additional space occupied by the fasteners used to secure the halves of the power tool housings together may cause the size of the power tool housings to be undesirable in certain applications. Accordingly, the present disclosure relates to a power tools having a reduced size.

To that end, an illustrative embodiment of the present disclosure provides a power tool which comprises a front housing, a plurality of fasteners, a back cap, a motor, and a motor housing. The front housing supports an output drive, and the back cap located opposite the front housing. The back cap includes a plurality of apertures each sized to receive one fastener of the plurality of fasteners. The motor housing supports a motor and is located between the front housing and the back cap. The motor includes a rotor that is configured to rotate about a motor axis to drive rotation of the output drive. The at least one fastener of the plurality of fasteners engages the back cap and is disposed in at least one of the plurality of apertures of the back cap. The motor housing includes a plurality of grooves that extend substantially parallel to the motor axis. One groove of the plurality of grooves is aligned with one aperture of the plurality of apertures of the back cap. Each fastener of the plurality of fasteners is disposed through one of the plurality of apertures of the back cap, along one groove of the plurality of grooves of the motor housing, and secures to the front housing coupling the front housing, the motor housing, and the back cap together. Lastly, the plurality of fasteners extends substantially parallel to the motor axis when coupling the front housing, the motor housing, and the back cap together.

In the above and other embodiments of the present disclosure may also comprise: the front housing including a plurality of threaded recesses, wherein each threaded recess being aligned with one grove of the plurality of grooves in the motor housing and each threaded recess being configured to receive one fastener of the plurality of fasteners; a body that wraps around at least a portion of the motor housing between the front housing and the end cap; the body defining an interior space in which the motor housing is positioned and through which the plurality of fasteners extend when the front housing, the motor housing, and the back cap are coupled together; the body further including at least two body parts wherein each of the body parts wrap around at least a portion of the motor housing between the front housing and the end cap; at least one of the at least two body parts includes a flange that engages the front housing; and at least one of the at least two body parts includes a flange that engages the back cap.

Another illustrative embodiment of the present disclosure provides a power tool that also comprises a front housing, a plurality of fasteners, a back cap, a motor, and a motor housing. The front housing supports an output drive, and the back cap is located opposite the front housing. The motor housing supports a motor and is located between the front housing and the back cap. The motor includes a rotor configured to rotate about a motor axis to drive rotation of the output drive. At least one fastener of the plurality of fasteners engages the back cap and secures the motor housing to the front housing. The plurality of fasteners also extends substantially parallel to the motor axis when coupling the front housing, the motor housing, and the back cap together.

In the above and other embodiments of the present disclosure may also comprise: a body that wraps around at least a portion of the motor housing between the front housing and the end cap; the body defines an interior space in which the motor housing is positioned when the front housing, the motor housing, and the back cap are coupled together; the body further including at least two body parts wherein each of the body parts wraps around at least a portion of the motor housing between the front housing and the end cap; at least one of the at least two body parts includes a tab that engages the front housing; and at least one of the at least two body parts includes a tab that engages the back cap.

Another illustrative embodiment of the present disclosure provides a power tool that comprises a front housing, an output drive, a back cap, a motor housing, a motor, and a plurality of fasteners. The front housing supports the output drive. The back cap is located opposite the front housing. The motor housing supports the motor. The motor includes a rotor configured to rotate about a motor axis to drive rotation of the output drive. The plurality of fasteners extends parallel to the motor axis, each of the plurality of fasteners engage the front housing and the motor housing, and the plurality of fasteners extends substantially parallel to the motor axis when coupling the front housing and the motor housing together.

In the above and other embodiments of the present disclosure may also comprise: a back cap that includes a plurality of apertures each sized to receive one fastener of the plurality of fasteners; the motor housing being located between the front housing and the back cap; the motor housing includes a plurality of grooves that extends substantially parallel to the motor axis, and wherein one groove of the plurality of grooves is aligned with one aperture of a plurality of apertures disposed in the back cap; each fastener of the plurality of fasteners is disposed through one of a plurality of apertures disposed in the back cap, along one groove of a plurality of grooves on the motor housing, and secures to the front housing to couple the front housing, the motor housing, and the back cap together; a body that wraps around at least a portion of the motor housing adjacent the front housing, wherein the body defines an interior space in which the motor housing is positioned when the front housing and the motor housing are coupled together, and wherein the body is selected from the group consisting of at least one body part and a plurality of body parts; and the body including at least one tab that engages the front housing.

BRIEF DESCRIPTION OF THE DRAWINGS

The concepts described in the present disclosure are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels may be repeated among the figures to indicate corresponding or analogous elements.

DETAILED DESCRIPTION OF THE DRAWINGS

Figure 1:
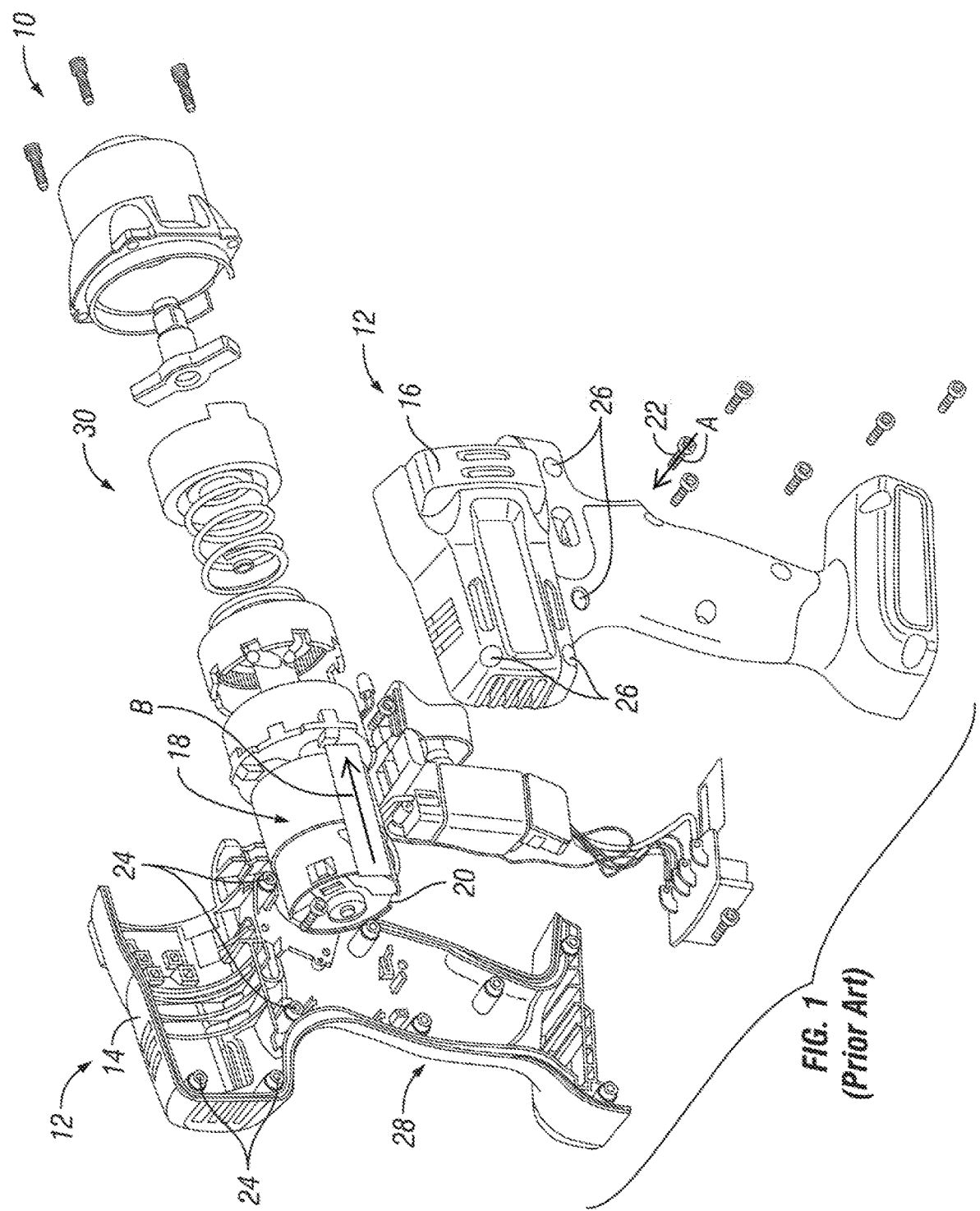
FIG. 1 is an exploded perspective view of various components held by a housing of a PRIOR ART power tool.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the present disclosure.

Referring now to FIG. 1, a PRIOR ART power tool 10 is shown. The power tool 10 includes a power tool housing 12 that has a "clam-shell" construction, meaning that internal components of the power tool 10, such as the motor 18 and the motor housing 20, are held by two halves or "clam shells" 14, 16 of the housing 12 which are secured together (along with other housing components) to form the housing 12. This "clam shell" housing 12 is generally divided along a parting plane that passes through both the handle 28 of the power tool 10 and the axis about which the rotor of the motor 18 rotates during operation (which, in this embodiment, is also the axis about which components of an impact mechanism 30 of the power tool 10 rotate during operation). Components of the motor housing 20 are secured together separately from the halves 14, 16 to form the housing 20 that contains the motor 18.

The halves 14, 16 of the housing 12 are configured to receive fasteners 22 to secure the halves 14, 16 together as shown in PRIOR ART FIG. 1. Specifically, the half 14 is formed to include apertures 24, and the half 16 is formed to include apertures 26. During assembly of the tool 10, the halves 14, 16 are aligned to permit the fasteners 22 to be received by corresponding apertures 24, 26 of the halves 14, 16. As such, the fasteners 22 extend in a direction indicated by arrow A that is substantially perpendicular to a direction indicated by arrow B in which the motor 18 and the motor housing 20 extend (the arrow B being generally parallel to the axis about which both the rotor of the motor 18 and the components of the impact mechanism 30 rotate during operation).

In the PRIOR ART design shown in FIG. 1, the fasteners 22 are positioned both above and below the motor 18 and the motor housing 20. In that way, the fasteners 22 extend around the motor 18 and the motor housing 20 (without passing through any component of the motor 18 or the motor housing 20).

The halves 14, 16 are sized to allow the fasteners 22 to extend around the motor 18 and the motor housing 20 when the tool 10 is assembled, as suggested by PRIOR ART FIG. 1. Due to the size of the halves 14, 16, the size of the housing 12 may be undesirable in certain situations, such as when space constraints impeding the use of the tool 10 are present. Alternatives that enable the size of housing 12, and thus the package size of the power tool 10, to be reduced would therefore be beneficial in such situations.

Figure 2:
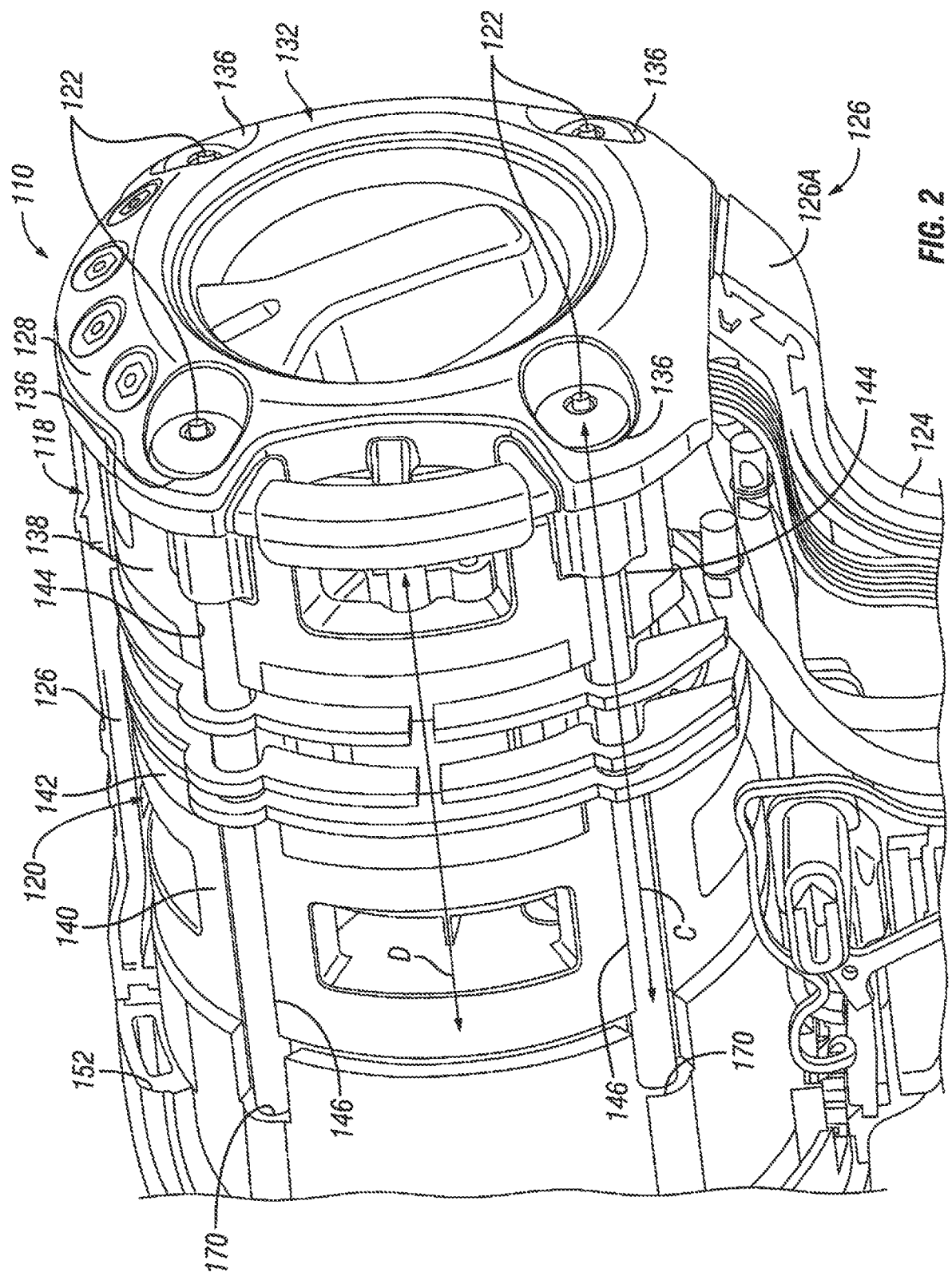
FIG. 2 is a perspective view of a portion of an illustrative power tool according to the present disclosure.
Figure 6:
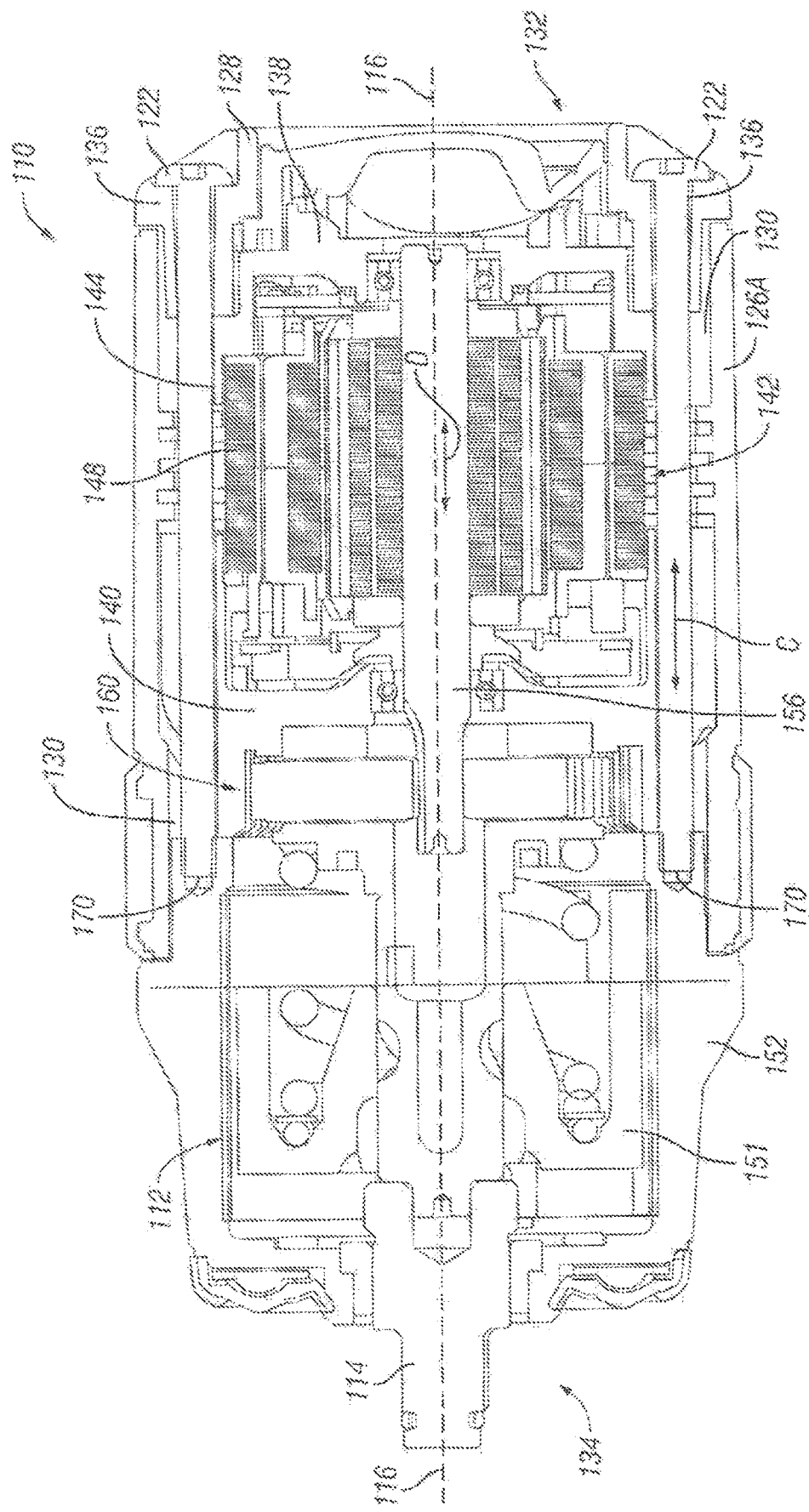
FIG. 6 is a cross-sectional side view of a portion of the power tool of FIG. 2.

Referring now to FIG. 2 and FIG. 6, an illustrative power tool 110 according to the present disclosure is shown. Like the power tool 10 of PRIOR ART FIG. 1, the power tool 110 shown in FIG. 2 is illustratively embodied as a cordless, electric impact tool (in particular, an electric, pistol-style impact tool). In various embodiments, the power tool 110 may be embodied as a pistol-grip impact tool, an in-line impact tool, or an angle impact tool, such as a right-angle impact tool. The power tool 110 includes an impact mechanism 112 that is operable to drive rotation of an output drive 114 (shown in FIG. 6) of the power tool 110 about an axis 116 (shown in FIG. 6), as best seen in the cross-sectional side view of FIG. 6. It should be appreciated, however, that in other embodiments, the power tool 110 may be embodied as an electric power tool that does not include an impact mechanism, such as a corded or cordless electric drill, driver, or ratchet.

The illustrative power tool 110 includes a tool housing 118 that is broken away to show that the power tool 110 also includes a motor housing 120 and fasteners 122, as best seen in FIG. 2. In contrast to the PRIOR ART power tool 10 of FIG. 1, the tool housing 118 of the tool 110 is not assembled separately from the motor housing 120 of the tool 110. Rather, the fasteners 122 are used to secure components of both the tool housing 118 and the motor housing 120 together, such that the motor housing 120 is supported by the tool housing 118.

The tool housing 118 includes a hammer case 152, a body 126, and a back cap 128, as shown in FIG. 2. The body 126 defines an interior space 130 in which the motor housing 120 is positioned and through which the fasteners 122 extend when the tool 110 is assembled. The hammer case 152 is coupled to the body 126, when the tool 110 is assembled, to close off the interior space 130 and define an output end 134 (shown in FIG. 6) of the tool 110. The hammer case 152 is formed to include threaded recesses 170 that receive the threaded ends of the fasteners 122 when the tool 110 is assembled. As such, the hammer case 152 may be considered a "front housing" or "front cap" of the tool housing 118. In the illustrative embodiment, the hammer case 152 supports the impact mechanism 112 of the tool 110. The back cap 128 is also coupled to the body 126, when the tool 110 is assembled, to close off the interior space 130 and define a back end 132 that is positioned opposite the output end 134 (shown in FIG. 6) of the tool 110. The back cap 128 is formed to include apertures 136 that extend through the back cap 128 and open into the interior space 130 when the tool 110 is assembled. These apertures 136 are sized to receive the fasteners 122 as shown in FIG. 2.

The body 126 is illustratively formed from two mirror-image halves 126A, 126B, only one of which is shown in FIG. 2. It should be appreciated, however, that in other embodiments, the body 126 may be formed from a single piece or from more than two pieces. The halves 126A, 126B extend downwardly from the back cap 128 to define a handle 124 which may be grasped by a user of the power tool 110. The halves 126A, 126B each extend between the hammer case 152 and the back cap 128, such that the body 126 supports the motor housing 120 when the tool 110 is assembled, as suggested by FIG. 2. In the illustrative embodiment, the halves 126A, 126B of the body 126 are generally divided along a parting plane that passes through both the handle 124 and the motor housing 120.

Figure 3:
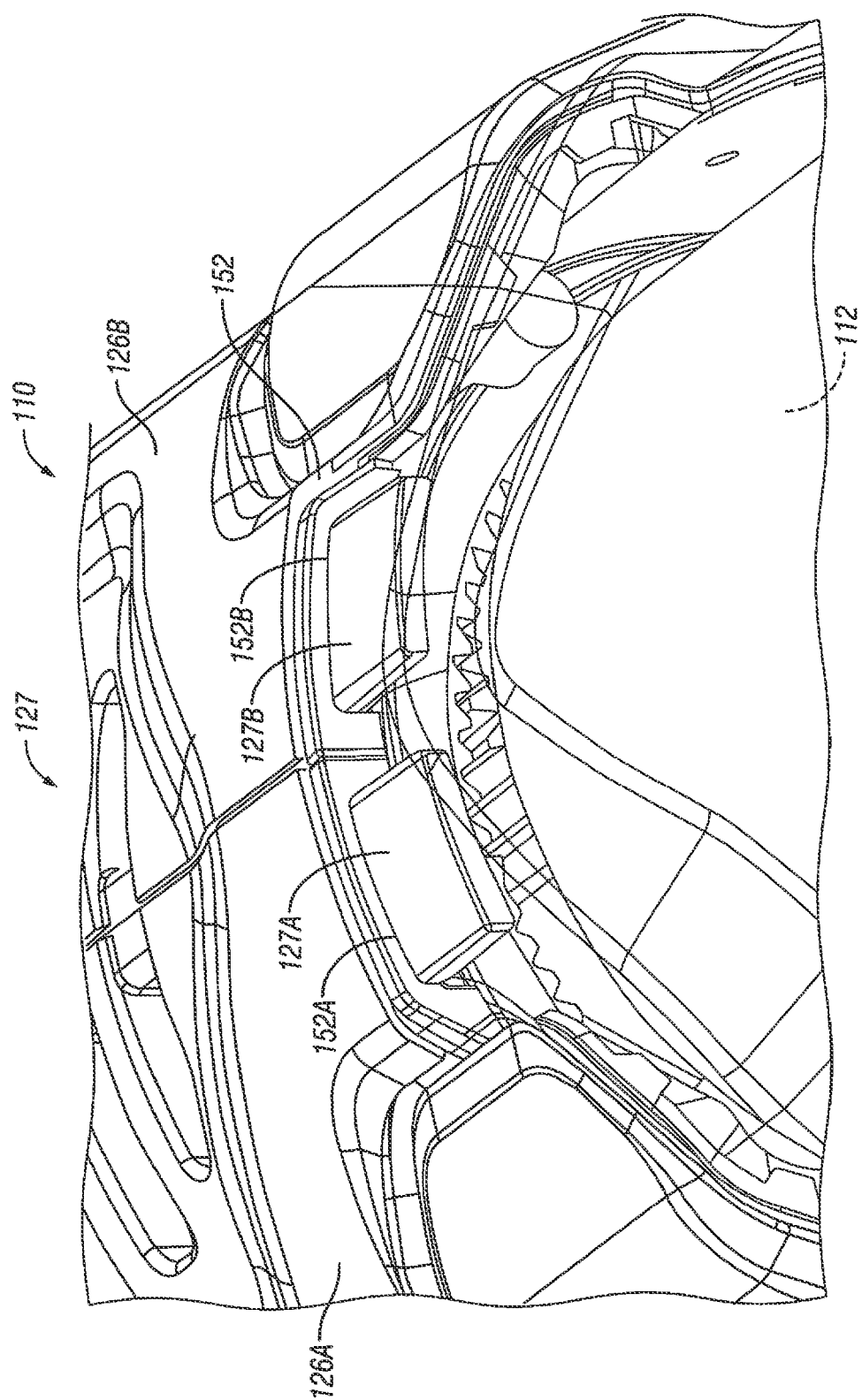
FIG. 3 is a detailed perspective view of an interface between components of a tool housing of the power tool of FIG. 2.

Referring now to FIG. 3 and FIG. 2, the body 126 (shown in FIG. 2) illustratively includes features 127 that are used to position the halves 126A, 126B (of the body 126) relative to one another during assembly of the tool 110. Specifically, each of the halves 126A, 126B is formed to include a respective flange 127A, 127B that is received by one of a pair of corresponding channels 152A, 152B formed in the hammer case 152 of the tool housing 118 (see FIG. 2). When the flanges 127A, 127B are received by the channels 152A, 152B, the halves 126A, 126B are guided toward one another around the motor housing 120 (see FIG. 2), thereby minimizing any gap between the halves 126A, 126B and facilitating engagement of the motor housing 120 (see FIG. 2) by the body 126 (shown in FIG. 2) during assembly of the tool 110.

Figure 4:
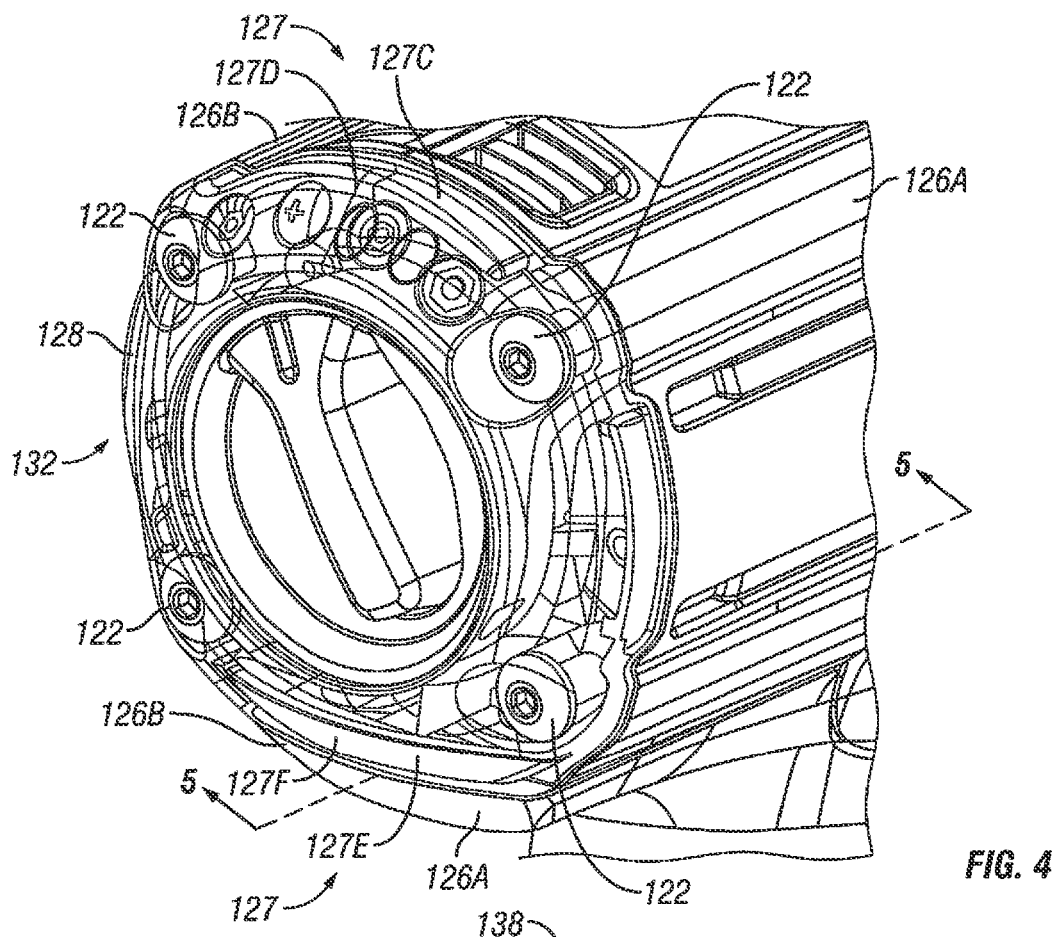
FIG. 4 is another detailed perspective view of an interface between other components of the tool housing of the power tool of FIG. 2.
Figure 5:
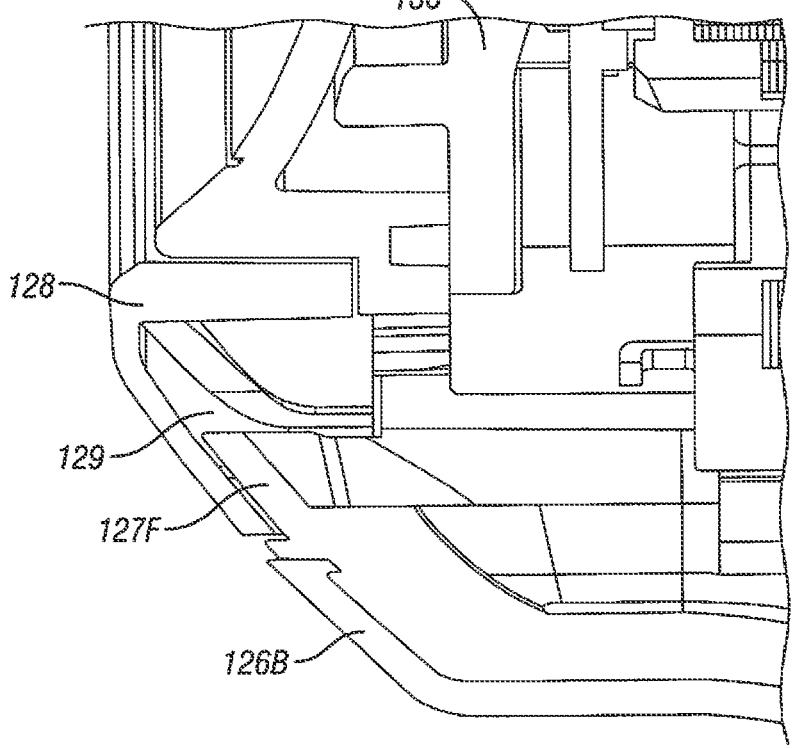
FIG. 5 is a sectional view taken about line 5-5 of FIG. 4.

Referring now to FIGS. 4-5, the features 127 also include projections 127C-F that are provided on each of the halves 126A and received by the back cap 128 during assembly of the tool 110. In the illustrative embodiment, the half 126A includes an upper projection 127C and a lower projection 127E, while the half 126B includes an upper projection 127D and a lower projection 127F. During assembly of the tool 110, the halves 126A, 126B are guided toward one another until the projections 127C, 127D align with and engage one another and the projections 127E, 127F align with and engage one another, thereby minimizing any gap between the halves 126A, 126B. Once the projections 127C-F of the halves 126A, 126B align with and engage one another, the back cap 128 is engaged with the halves 126A, 126B so that the projections 127C-F are received by slots 129 formed in the back cap 128 (one of which is shown in FIG. 5).

The features 127 therefore facilitate attachment of the halves 126A, 126B of the body 126 (shown in FIG. 2) to the hammer case 152 and the back cap 128 to minimize any gap existing between the halves 126A, 126B during assembly of the tool 110, as shown in FIGS. 3-5. Once the halves 126A, 126B are positioned relative to the hammer case 152 and the back cap 128 as discussed above, the fasteners 122 are used to secure the back cap 128 to the hammer case 152, with the halves 126A, 126B sandwiched between the back cap 128 and the hammer case 152, to assemble the tool housing 118 of the tool 110.

Referring again to FIG. 2, the motor housing 120 includes an end bell 138 that abuts the back cap 128 and an end bell 140 that abuts the hammer case 152 when the tool 110 is assembled. The end bell 140 is adjacent a transmission 160 of the power tool 110 that extends between the end bell 140 and the impact mechanism 112, as best seen in FIG. 6. The end bells 138, 140 cooperatively support a rotor 156 and a stator 148 of a motor 142 of the tool 110. The end bell 138 is formed to include grooves 144 that extend through the end bell 138 parallel to the axis 116. Likewise, the end bell 140 is formed to include grooves 146 that extend through the end bell 140 parallel to the axis 116. When the tool 110 is assembled as shown in FIG. 2, the grooves 144 of the end bell 138 are aligned with the grooves 146 of the end bell 140, both of which are aligned with the apertures 136 of the back cap 128 and with the recesses 170 formed in the hammer case 152.

The end bell 138 of the motor housing 120 and the back cap 128 of the tool housing 118 are illustratively separate components as shown in, and described above with reference to, FIG. 2. It should be appreciated, however, that in other embodiments, the end bell 138 and the back cap 128 may be provided as a unitary or integral component. In other words, in some embodiments, the same component may serve as both the end bell 138 of the motor housing 120 and the back cap 128 of the tool housing 118.

The motor 142 is illustratively embodied as an electric motor, as suggested by FIG. 2. The motor 142 includes a stationary component, i.e., the stator 148, that is positioned between the end bells 138, 140. The motor 142 also includes the rotor 156 which is configured to rotate about the axis 116 to drive rotation of the output drive 114 (via the transmission 160 and the impact mechanism 112). The stator 148 may further define channels that extend through the stator 148 parallel to the axis 116. When the tool 110 is assembled as shown in FIGS. 2 and 6, the channels of the stator 148 are aligned with the grooves 144, 146 of the end bells 138, 140, with the apertures 136 of the back cap 128, and with the recesses 170 formed in the hammer case 152.

Referring now to FIGS. 2 and 6, the hammer case 152 of the impact mechanism 112 supports a hammer 151 of the impact mechanism 112. As noted above, the hammer case 152 is formed to include threaded recesses 170 that each receives a threaded end of one of the fasteners 122. These recesses 170 each extend parallel to the axis 116, as best seen in FIG. 6. When the tool 110 is assembled as shown in FIGS. 2 and 6, the recesses 170 of the hammer case 152 are aligned with the grooves 144, 146 of the end bells 138, 140, and the apertures 136 of the back cap 128.

The fasteners 122 are inserted through the apertures 136, the grooves 144, and the grooves 146, and into the recesses 170 when the tool 110 is assembled, as shown in FIGS. 2 and 6. The fasteners 122 secure the back cap 128 to the hammer case 152, with the body 126 sandwiched between the back cap 128 and hammer case 152, to form the tool housing 118. Additionally, the fasteners 122 secure the end bells 138, 140 around the stator 148 to form the motor housing 120. In that way, the fasteners 122 secure the tool housing 118 and the motor housing 120 together so that the motor housing 120 is supported by the tool housing 118.

The fasteners 122 illustratively extend in a direction indicated by arrow C that is parallel to a direction indicated by arrow D in which the motor 142 and the motor housing 120 extend, as shown in FIGS. 2 and 6. The fasteners 122 engage the back cap 128 and extend therefrom through the interior space 130 to the hammer case 152. The fasteners 122 illustratively include four fasteners in the embodiment of FIGS. 2-6. It should be appreciated, however, that in other embodiments, more or less than four fasteners may be used. Additionally, it should be appreciated that, in some embodiments, fasteners may not be used at all. Rather, clips or metal tie straps, or the like, may be used.

In one respect, because the fasteners 122 extend through the motor 142 and the motor housing 120, rather than around the motor 142 and the motor housing 120, the package size of the power tool 110 may be smaller than the package size of the power tool 10. In another respect, because the motor housing 120 and the tool housing 118 are secured together via one set of fasteners 122, the separate components used to secure the tool housing 12 and the motor housing 20 together may be avoided, and thus the package size of the power tool 110 may be smaller than the package size of the power tool 10.

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There are a plurality of advantages of the present disclosure arising from the various features of the apparatus, systems, and methods described herein. It will be noted that alternative embodiments of the apparatus, systems, and methods of the present disclosure may not include all of the features described yet still benefit from at least some of the advantages of such features. Those of ordinary skill in the art may readily devise their own implementations of the apparatus, systems, and methods that incorporate one or more of the features of the present disclosure.

The invention claimed is:

1. A power tool comprising:
   a front housing;
   a back cap opposite the front housing, the back cap defining a plurality of apertures;
   a motor assembly between the front housing and the back cap, the motor assembly including:
      a first end bell,
      a second end bell opposite the first end bell, and
      an electric motor between the first end bell and the second end bell, the electric motor having a motor axis, at least one of the first end bell or the second end bell including a plurality of grooves that extends substantially parallel to the motor axis, each one of the plurality of grooves open outwardly at a circumferential periphery of the at least one of the first end bell or the second end bell; and
   a plurality of fasteners, each one of the plurality of fasteners extending substantially parallel to the motor axis, through at least one aperture of the plurality of apertures of the back cap, through at least one groove of the plurality of grooves of the at least one of the first end bell or the second end bell, and into the front housing to connect the front housing, the first end bell, the second end bell, and the back cap together.

2. The power tool as recited in claim 1, wherein the front housing comprises a plurality of threaded recesses, each one of the plurality of threaded recesses aligned with a groove of the plurality of grooves of the at least one of the first end bell or the second end bell and configured to receive a fastener of the plurality of fasteners.

3. The power tool as recited in claim 1, further comprising a body around at least a portion of the motor assembly between the front housing and the back cap.

4. The power tool as recited in claim 3, wherein the body defines an interior space in which the motor assembly is positioned and through which the plurality of fasteners extends.

5. The power tool as recited in claim 3, wherein the body comprises a first part and a second part, each one of the first part and the second part of the body disposed around the at least the portion of the motor assembly between the front housing and the back cap.

6. The power tool as recited in claim 3, wherein the body comprises a flange that engages the front housing.

7. The power tool as recited in claim 3, wherein the body comprises a flange that engages the back cap.

8. A power tool comprising:
   a front housing;
   a back cap opposite the front housing, the back cap defining a plurality of apertures;
   a motor assembly between the front housing and the back cap, the motor assembly including:
      a first end bell including a plurality of grooves that each open outwardly at a circumferential periphery of the first end bell,
      a second end bell opposite the first end bell and including a plurality of grooves that each open outwardly at a circumferential periphery of the second end bell, and
      an electric motor between the first end bell and the second end bell, the electric motor having a motor axis, the plurality of grooves of the first end bell and the plurality of grooves of the second end bell extending substantially parallel to the motor axis; and
   a plurality of fasteners, each one of the plurality of fasteners extending substantially parallel to the motor axis, through at least one aperture of the plurality of apertures of the back cap, through at least one groove of the plurality of grooves of the first end bell, through at least one groove of the plurality of grooves of the second end bell, and into the front housing to connect the front housing, the first end bell, the second end bell, and the back cap together.

9. The power tool as recited in claim 8, wherein the front housing comprises a plurality of threaded recesses, each one of the plurality of threaded recesses aligned with a groove of the plurality of grooves of at least one of the first end bell or the second end bell and configured to receive a fastener of the plurality of fasteners.

10. The power tool as recited in claim 8, further comprising a body around at least a portion of the motor assembly between the front housing and the back cap.

11. The power tool as recited in claim 10, wherein the body defines an interior space in which the motor assembly is positioned and through which the plurality of fasteners extends.

12. The power tool as recited in claim 10, wherein the body comprises a first part and a second part, each one of the first part and the second part of the body disposed around the at least the portion of the motor assembly between the front housing and the back cap.

13. The power tool as recited in claim 10, wherein the body comprises a flange that engages the front housing.

14. The power tool as recited in claim 10, wherein the body comprises a flange that engages the back cap.

15. A power tool comprising:
   a motor assembly including:
      a first end bell,
      a second end bell opposite the first end bell, and
      an electric motor between the first end bell and the second end bell, the electric motor having a motor axis, at least one of the first end bell or the second end bell including a plurality of grooves that extends substantially parallel to the motor axis, each one of the plurality of grooves open outwardly at a circumferential periphery of the at least one of the first end bell or the second end bell; and a plurality of fasteners, each one of the plurality of fasteners extending substantially parallel to the motor axis and through at least one groove of the plurality of grooves of the at least one of the first end bell or the second end bell to connect the first end bell and the second end bell together.

16. The power tool as recited in claim 15, further comprising a front housing and a back cap at opposing ends of the motor assembly, and a body around at least a portion of the motor assembly between the front housing and the back cap, the body defining an interior space in which the motor assembly is positioned and through which the plurality of fasteners extends.

17. The power tool as recited in claim 16, wherein the body comprises a first part and a second part, each one of the first part and the second part of the body disposed around the at least the portion of the motor assembly between the front housing and the back cap.

18. The power tool as recited in claim 16, wherein the body comprises a flange that engages at least one of the front housing or the back cap.

\* \* \* \* \*